US011379544B2

(12) United States Patent
Ardhanari et al.

(10) Patent No.: US 11,379,544 B2
(45) Date of Patent: *Jul. 5, 2022

(54) SYSTEMS AND METHODS FOR UPDATING LINKS BETWEEN KEYWORDS ASSOCIATED WITH A TRENDING TOPIC

(71) Applicant: Rovi Guides, Inc., San Jose, CA (US)

(72) Inventors: Sankar Ardhanari, Windham, NH (US); Daren Gill, Concord, MA (US); Abhijit Savarkar, Andover, MA (US); Ganesh Ramamoorthy, Andover, MA (US); Ajay Gupta, Andover, MA (US); Vineet Agarwal, Andover, MA (US); Sashikumar Venkataraman, Andover, MA (US)

(73) Assignee: Rovi Guides, Inc., San Jose, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 16/119,796

(22) Filed: Aug. 31, 2018

(65) Prior Publication Data
US 2019/0087502 A1 Mar. 21, 2019

Related U.S. Application Data

(63) Continuation of application No. 14/673,730, filed on Mar. 30, 2015, now Pat. No. 10,068,023.
(Continued)

(51) Int. Cl.
G06F 7/00 (2006.01)
G06F 16/9535 (2019.01)
G06F 16/435 (2019.01)
G06Q 30/02 (2012.01)
G06Q 50/00 (2012.01)
(Continued)

(52) U.S. Cl.
CPC ........ G06F 16/9535 (2019.01); G06F 3/0482 (2013.01); G06F 3/04817 (2013.01); G06F 16/435 (2019.01); G06N 5/04 (2013.01); G06Q 30/00 (2013.01); G06Q 30/0241 (2013.01); G06Q 50/01 (2013.01);
(Continued)

(58) Field of Classification Search
CPC .. G06F 16/9535; G06F 16/435; G06F 3/0481; G06F 3/04817; G06F 3/0482; H04M 1/72448; H04M 1/72412; H04M 1/72469
USPC ........ 707/722, 723, 727, 730, 728, 738, 741
See application file for complete search history.

(56) References Cited

U.S. PATENT DOCUMENTS

| 2013/0110823 A1* | 5/2013 | Su ........................ G06F 16/9535 707/723 |
| 2014/0040228 A1* | 2/2014 | Kritt ..................... G06F 16/248 707/706 |
| 2016/0085866 A1* | 3/2016 | Venkatesh ........... G06F 16/3344 707/730 |

* cited by examiner

Primary Examiner — Md I Uddin
(74) Attorney, Agent, or Firm — Haley Guiliano LLP

(57) ABSTRACT

Systems and methods are described herein for updating links between keywords associated with a trending topic. Control circuitry may identify a plurality of communications associated with a plurality of users, the plurality of communications being related to a topic. The communications may comprise, for example, emails, text messages, online social media posts, websites or portions of a website, or any other online communication. The control circuitry may determine whether the topic is trending and increase a strength of association between a first symbol associated with the topic and a second symbol associated with the topic such that when a search query is received that includes the first symbol, search results related to the second symbol have a higher probability of being returned.

14 Claims, 5 Drawing Sheets

Related U.S. Application Data

(60) Provisional application No. 62/098,077, filed on Dec. 30, 2014.

(51) Int. Cl.
*H04M 1/72412* (2021.01)
*H04M 1/72448* (2021.01)
*H04M 1/72469* (2021.01)
*G06F 3/04817* (2022.01)
*G06F 3/0482* (2013.01)
*G06N 5/04* (2006.01)
*G06Q 30/00* (2012.01)

(52) U.S. Cl.
CPC ... *H04M 1/72412* (2021.01); *H04M 1/72448* (2021.01); *H04M 1/72469* (2021.01)

SYSTEMS AND METHODS FOR UPDATING LINKS BETWEEN KEYWORDS ASSOCIATED WITH A TRENDING TOPIC

CROSS-REFERENCE TO RELATED APPLICATIONS

This application is a continuation of U.S. patent application Ser. No. 14/673,730, filed Mar. 30, 2015, which claims priority benefit under 35 U.S.C. § 119(e) from U.S. provisional application No. 62/098,077, filed Dec. 30, 2014, all of which are hereby incorporated by reference herein in their entirety.

BACKGROUND

Media providers typically provide a search function to allow users to search for desirable media assets. In order to provide more accurate search results, an interactive media guidance application may maintain a knowledge graph that includes contextual links between symbols. For example, a media guidance application may analyze historical search data and utilize a probabilistic classifier, such as a Naïve Bayes Classifier that determines the statistical probability that certain symbols relate to a certain topic. In this manner, the media guidance application may build a database that identifies related topics and symbols that may be used to return relevant search results to a user search query.

With the advent of social media, topics often explode in popularity for a relatively short period of time. Such topics are typically referred to as "trending" or "viral" topics. The accuracy of search algorithms may be improved by taking into account the "trending" status of topics and their related symbols.

SUMMARY

Systems and methods are described herein for updating links between keywords associated with a trending topic. In particular, systems and methods are described herein which may identify a trending topic, identify symbols that are related to the trending topic, and increase a strength of association between those symbols. As an illustrative example, the movie "Inception" may become a trending topic, as measured by the number of "likes" it has received in social media networks. The movie "Inception" may be related to the symbols "Leonardo DiCaprio" and "Joseph Gordon-Levitt," two actors who star in the movie. Control circuitry may identify that "Inception" is trending and thereby increase the strength of association between "Leonardo DiCaprio" and "Joseph Gordon-Levitt" such that when a user search query is received with "Leonardo DiCaprio," search results that include "Joseph Gordon-Levitt" are returned with a higher probability.

In some aspects, control circuitry may identify a plurality of communications associated with a plurality of users, the plurality of communications being related to a topic. The communications may comprise, for example, communications on an online social network, email messages, text messages, Internet communications, websites, mobile application communications, and/or communications received from a third-party data source. The control circuitry may determine whether the topic is trending and increase a strength of association between a first symbol associated with the topic and a second symbol associated with the topic such that when a search query is received that includes the first symbol, search results related to the second symbol have a higher probability of being returned.

In some embodiments, the control circuitry may determine whether the topic is trending by determining whether the plurality of communications related to the topic exceeds a threshold number of communications. For instance, the control circuitry may receive indications of a certain number of social media posts that relate to the topic, and if the number of social media posts exceeds a threshold number, the control circuitry may determine that the topic is trending. In some embodiments, the control circuitry may determine whether the topic is trending by determining whether a rate at which the plurality of communications are created exceeds a threshold rate. For instance, the control circuitry may receive indications (e.g., from a third-party data source) of creation times associated with the plurality of communications. The control circuitry may use the creation times to determine how quickly the plurality of communications are being created. As an illustrative example, the control circuitry may track a number of social media communications being created, such as a short online communication known as a "Tweet" provided through social media provider Twitter. The control circuitry may determine the number of Tweets per minute that relate to a certain topic, based on the creation times of the Tweets.

In other embodiments, the control circuitry may receive an indication of the rate of creations. For example, the control circuitry may receive an indication from a third-party data source of the Tweets per minute relating to a certain topic. The control circuitry may determine whether the rate of creation exceeds a threshold rate in order to determine whether the topic is trending. As an extension of the above example, the movie "Inception" may be mentioned in 10 Tweets per hour before opening night, but may be mentioned in 10,000 Tweets per hour on opening night. The spike in Tweets created may indicate that "Inception" is exploding in popularity and should be considered "trending" in the public opinion. In some embodiments, the control circuitry may receive an indication from a third-party data source that the topic is trending.

In some embodiments, the control circuitry may identify a first symbol and a second symbol associated with the topic. In some embodiments, the control circuitry may access a database that identifies the first symbol as being related to the second symbol. For instance, the control circuitry may access a knowledge graph that compiles contextual relationships between symbols based on, for example, historical user search data. In some embodiments, the control circuitry may directly access historical user search data in order to identify a first symbol and a second symbol as associated with the topic. For instance, the control circuitry may identify a plurality of prior search queries associated with the topic that contain at least one of the first symbol or the second symbol. If the number of prior search queries associated with the topic that contain at least one of the first or second symbol exceeds a threshold, then the control circuitry may determine that the topic is related to the first or the second symbol. As an illustrative example, the control circuitry may analyze past user search queries to identify that queries about the television show "Friends" often includes the symbols "Jennifer Aniston" and "Joey Tribbiani." The control circuitry may conclude based on these trends that the symbols "Jennifer Aniston" and "Joey Tribbiani" are related to the topic "Friends."

In some embodiments, the control circuitry may increase the strength of association between the first symbol and the second symbol based on an amount by which the plurality of communications exceeds the threshold number of communications. As an illustrative example, the threshold number of communications for a topic to be considered trending may be set at 10,000 communications. These communications may be any type of online communication, such as posts on a social network such as Facebook. Typically, social networks such as Facebook allow a plurality of users to create posts about topics of their choosing. For a topic that has 11,000 Facebook posts, the strength of association between the first symbol and the second symbol may be increased a relatively small amount. For a topic that has 1,000,000 Facebook posts, the strength of association between the first symbol and the second symbol may be increased a relatively large amount. In this manner, the control circuitry may increase the strength of association between the first symbol and the second symbol based on by how much the plurality of communications exceeds the threshold number. In some embodiments, the control circuitry may access a graded scale or a lookup table in order to determine how much to increase the strength of association based on the amount by which the plurality of communications exceeds the threshold number of communications.

In some embodiments, the control circuitry may increase the strength of association between the first symbol and the second symbol based on the rate at which the plurality of communications are created or based on an amount by which the rate at which the plurality of communications are created exceeds the threshold rate. For instance, the threshold rate for a trending topic may be set at 1,000 Tweets per hour. For a topic that is trending at 1,100 Tweets per hour, the control circuitry may increase the strength of association between the first and the second symbol a relatively small amount. For a topic that is trending at 1,000,000 Tweets per hour, the control circuitry may increase the strength of association between the first and the second symbol a relatively large amount. In some embodiments, the control circuitry may access a graded scale or a lookup table in order to determine how much to increase the strength of association based on the rate of creation of the plurality of communications.

In some embodiments, the control circuitry may further determine whether the topic is no longer trending and, in response to determining that the topic is no longer trending, decrease the strength of association between the first symbol and the second symbol. Topics typically do not trend for long periods of time, and when topics start to lose popularity, it may be appropriate to decrease the strength of association between its related keywords. As an illustrative example, a news story about the Super Bowl might receive a lot of public attention during the lead-up to the game and immediately after the game. However, after the game is played, the public attention may begin to wane. In this case, the strength of association of symbols associated with the Super Bowl may be decreased in order to reflect the relative decrease in popularity over time. In some embodiments, the control circuitry may decrease the strength of association between the first symbol and the second symbol a predetermined amount after a set period of time. In this manner, the strength of association may gradually decay over time. In some embodiments, the control circuitry may determine whether the plurality of communications related to the topic falls below a threshold number of communications or whether a rate at which the plurality of communications are created falls below a threshold rate. In these cases, the topic may no longer be considered trending, and the control circuitry may decrease the strength of association. In some embodiments, the control circuitry may decrease the strength of association to an original level. For example, the control circuitry may have increased the strength of association between the first symbol and the second symbol from a first strength of association to a second strength of association. When the topic is no longer trending, the control circuitry may then decrease the strength of association from the second strength of association to the first strength of association.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
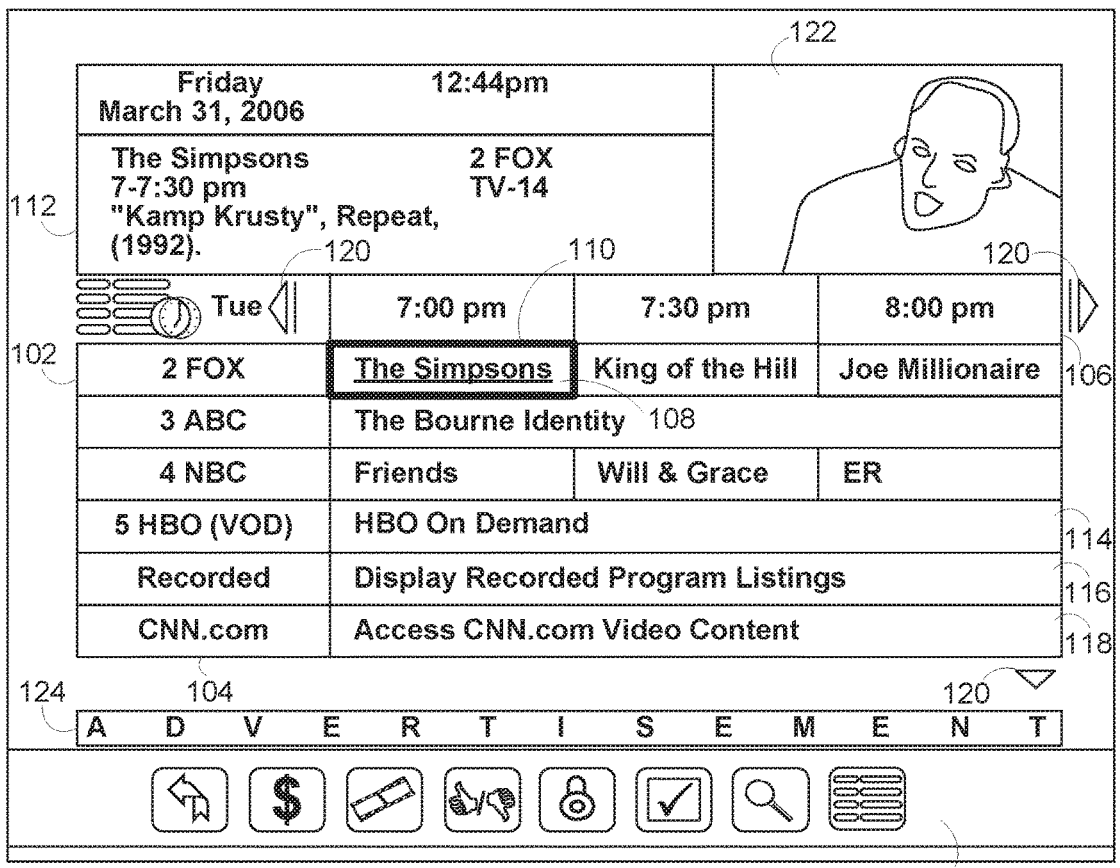
FIG. 1 shows an illustrative example of a display screen for use in accessing media content in accordance with some embodiments of the disclosure.

Systems and methods are described herein for updating links between keywords associated with a trending topic. A "trending" topic is one that has increased popularity for a certain period of time. Trending topics may be measured by a plurality of communications associated with a plurality of users, typically online communications. Control circuitry may identify a trending topic, identify symbols that are related to the trending topic, and increase a strength of association between those symbols. As used herein, "symbols" may refer to any keyword, phrase, or concept that may relate to a topic. As an illustrative example, the movie "Inception" may become a trending topic, as measured by the number of "likes" it has received in social media networks. The movie "Inception" may be related to the symbols "Leonardo DiCaprio" and "Joseph Gordon-Levitt," two actors who star in the movie. Control circuitry may identify that "Inception" is trending and thereby increase the strength of association between "Leonardo DiCaprio" and "Joseph Gordon-Levitt" such that when a user search query is received with "Leonardo DiCaprio," search results that include "Joseph Gordon-Levitt" are returned with a higher probability.

In some aspects, control circuitry may identify a plurality of communications associated with a plurality of users, the plurality of communications being related to a topic. The communications may comprise, for example, communications on an online social network, email messages, text messages, Internet communications, websites, mobile application communications, and/or communications received from a third-party data source. The control circuitry may determine whether the topic is trending based on the communications and increase a strength of association between a first symbol associated with the topic and a second symbol associated with the topic such that when a search query is received that includes the first symbol, search results related to the second symbol have a higher probability of being returned.

In some embodiments, the control circuitry may determine whether the topic is trending by determining whether the plurality of communications related to the topic exceeds a threshold number of communications. For instance, the control circuitry may receive indications of a certain number of social media posts that relate to the topic, and if the number of social media posts exceeds a threshold number, the control circuitry may determine that the topic is trending. In some embodiments, the control circuitry may determine whether the topic is trending by determining whether a rate at which the plurality of communications are created exceeds a threshold rate. For instance, the control circuitry may receive indications (e.g., from a third-party data source) of creation times associated with the plurality of communications. The control circuitry may use the creation times to determine how quickly the plurality of communications are being created. As an illustrative example, the control circuitry may determine the number of Tweets per minute that relate to a certain topic, based on the creation times of the Tweets. In other embodiments, the control circuitry may receive an indication of the rate of creations. For example, the control circuitry may receive an indication from a third-party data source of the Tweets per minute relating to a certain topic. The control circuitry may determine whether the rate of creation exceeds a threshold rate in order to determine whether the topic is trending. As an extension of the above example, the movie "Inception" may be mentioned in 10 Tweets per hour before opening night, but may be mentioned in 10,000 Tweets per hour on opening night. The spike in Tweets created may indicate that "Inception" is exploding in popularity and should be considered "trending" in the public opinion. In some embodiments, the control circuitry may receive an indication from a third-party data source that the topic is trending.

In some embodiments, the control circuitry may identify a first symbol and a second symbol associated with the topic. In some embodiments, the control circuitry may access a database that identifies the first symbol as being related to the second symbol. For instance, the control circuitry may access a knowledge graph that compiles contextual relationships between symbols based on, for example, historical user search data. Knowledge graphs and their features are described in greater detail in U.S. patent application Ser. No. 14/501,504, filed Sep. 30, 2014, U.S. patent application Ser. No. 14/500,309, filed Sep. 29, 2014, and U.S. patent application Ser. No. 14/448,308, filed Jul. 31, 2014, which are hereby incorporated by reference herein in their entireties.

In some embodiments, the control circuitry may increase the strength of association between the first symbol and the second symbol based on an amount by which the plurality of communications exceeds the threshold number of communications. As an illustrative example, the threshold number of communications for a topic to be considered trending may be set at 10,000 posts on Facebook. The control circuitry may determine the number of communications about a certain topic by using any suitable method or combination of methods. For instance, each of the plurality of communications may be associated with metadata that indicates the topic of the communication, and the control circuitry may track this metadata in order to determine the number of communications relating to a particular topic. As an illustrative example, each of the plurality of communications may be a Tweet that includes a text identifier called a hashtag (typically indicated by the symbol #). The control circuitry may automatically detect the "#" symbol and determine that the keyword or phrase after the "#" is the topic of the Tweet. In some embodiments, the control circuitry may determine the topic of a communication by parsing the communication for keywords and associating the detected keywords with the topic.

In some embodiments, the control circuitry may further determine whether the topic is decreasing in popularity and/or whether the topic is no longer trending. For instance, the control circuitry may detect that the number of communications relating to a particular topic being created is decreasing over time. In response to determining a decrease in popularity, the control circuitry may decrease the strength of association between the first symbol and the second symbol. Topics typically do not trend for long periods of time, and when a topic starts to lose popularity, it may be appropriate to decrease the strength of association between its related keywords. As an illustrative example, a news story about the Super Bowl might receive a lot of public attention during the lead-up to the game and immediately after the game. However, after the game is played, the public attention may begin to wane. In this case, the strength of association of symbols associated with the Super Bowl may be decreased in order to reflect the relative decrease in popularity over time. In some embodiments, the control circuitry may decrease the strength of association between the first symbol and the second symbol a predetermined amount after a set period of time. In this manner, the strength of association may gradually decay over time. In some embodiments, the control circuitry may determine whether the plurality of communications related to the topic falls below a threshold number of communications or whether a rate at which the plurality of communications are created falls below a threshold rate. In these cases, the topic may no longer be considered as decreasing in popularity or no longer trending, and the control circuitry may decrease the strength of association. In some embodiments, the control circuitry may dynamically decrease the strength of association an amount that is based on how much the topic decreased in popularity. For instance, the control circuitry may decrease the strength of association a relatively small amount for a small decrease in popularity (measured, e.g., by a small decrease in the number of communications created or by a small decrease in the rate of communications created). Similarly, the control circuitry may decrease the strength of association a relatively large amount for a large decrease in popularity (measured, e.g., by a large decrease in the number of communications created or by a large decrease in the rate of communications created). In some embodiments, the control circuitry may first detect whether the number of communications created or rate of communications created has exceeded a threshold before performing this type of dynamic change based on the amount of decrease in popularity. In some embodiments, the control circuitry may decrease the strength of association to an original level. For example, the control circuitry may have increased the strength of association between the first symbol and the second symbol from a first strength of association to a second strength of association. When the topic is no longer trending, the control circuitry may then decrease the strength of association from the second strength of association to the first strength of association.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, text documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
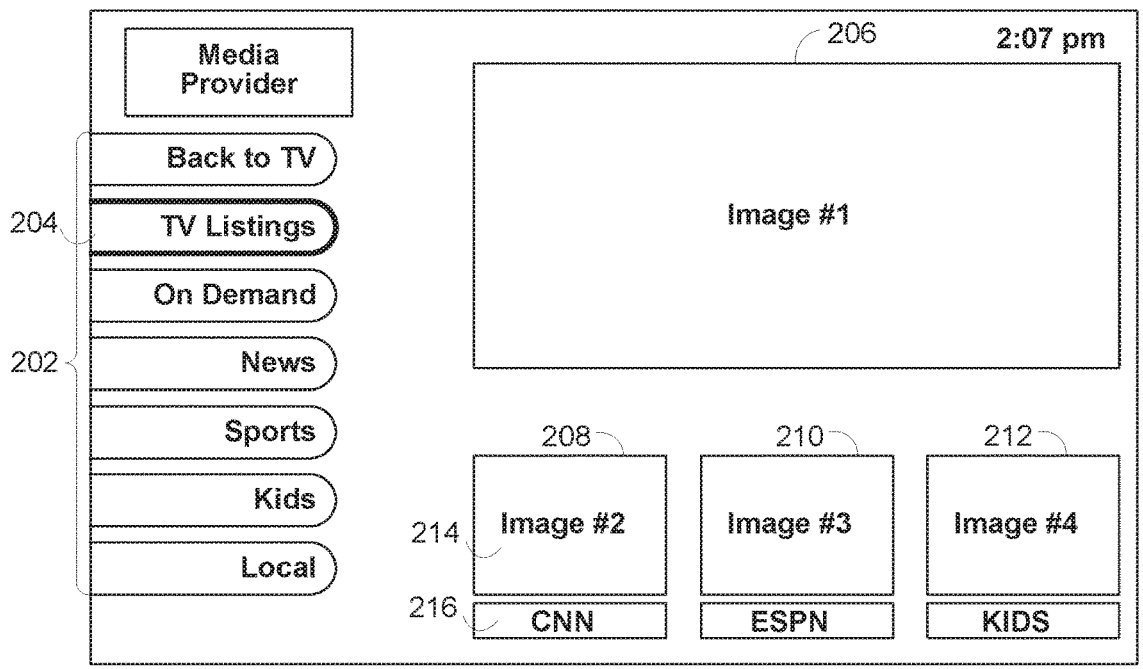
FIG. 2 shows another illustrative example of a display screen used access media content in accordance with some embodiments of the disclosure.

FIGS. 1-2 show illustrative display screens that may be used to provide media guidance data and media assets. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criterion.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criterion. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
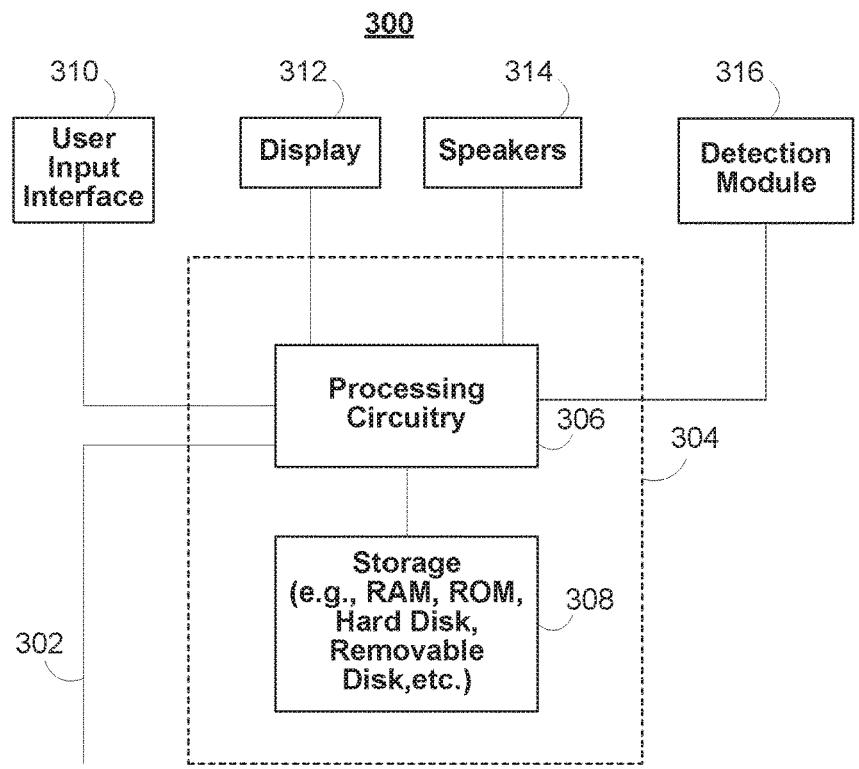
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
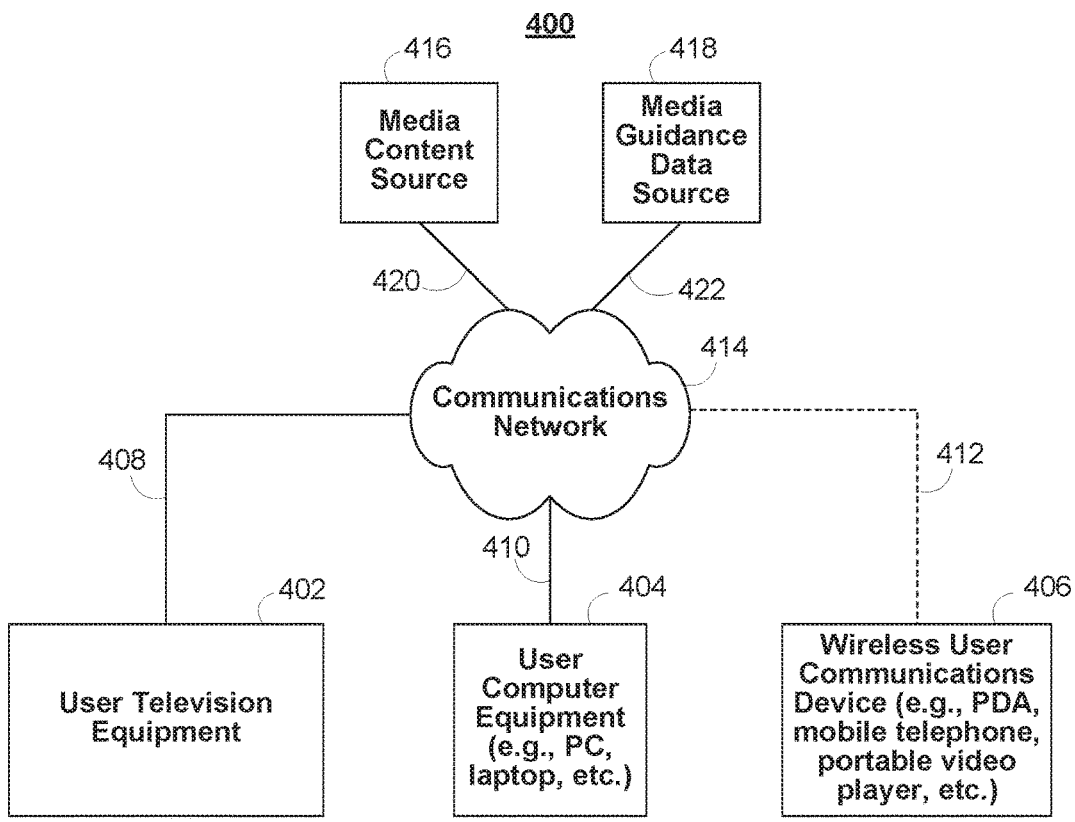
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data source 418 may comprise a database that maintains relationships between symbols. For example, the media guidance data source 418 may be a knowledge graph that contains contextual links between symbols. Control circuitry 304 may access guidance data source 418 in order to identify a first and a second symbol associated with a particular topic. In some embodiments, the control circuitry 304 may have direct write access to the database such that control circuitry 304 may increase or decrease a strength of association between a first symbol and a second symbol. In some embodiments, the control circuitry 304 may send requests to the media guidance data source 418 in order to increase or decrease a strength of association between a first symbol and a second symbol.

In some embodiments, media guidance data source 418 may comprise a social media network server that maintains communications for an online social media network. For example, media guidance data source 418 may be a Twitter server that receives, stores, and transmits Tweets from a plurality of Twitter users. In such embodiments, the media guidance data source 418 may receive a request from control circuitry 304 to provide statistical data on Tweets relating to a certain topic. For example, the control circuitry 304 may request the number of Tweets about a certain topic, the rate at which such Tweets are created, and/or the creation times of the Tweets about the topic. The control circuitry 304 may also request from the media guidance data source 418 a list of one or more trending topics.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
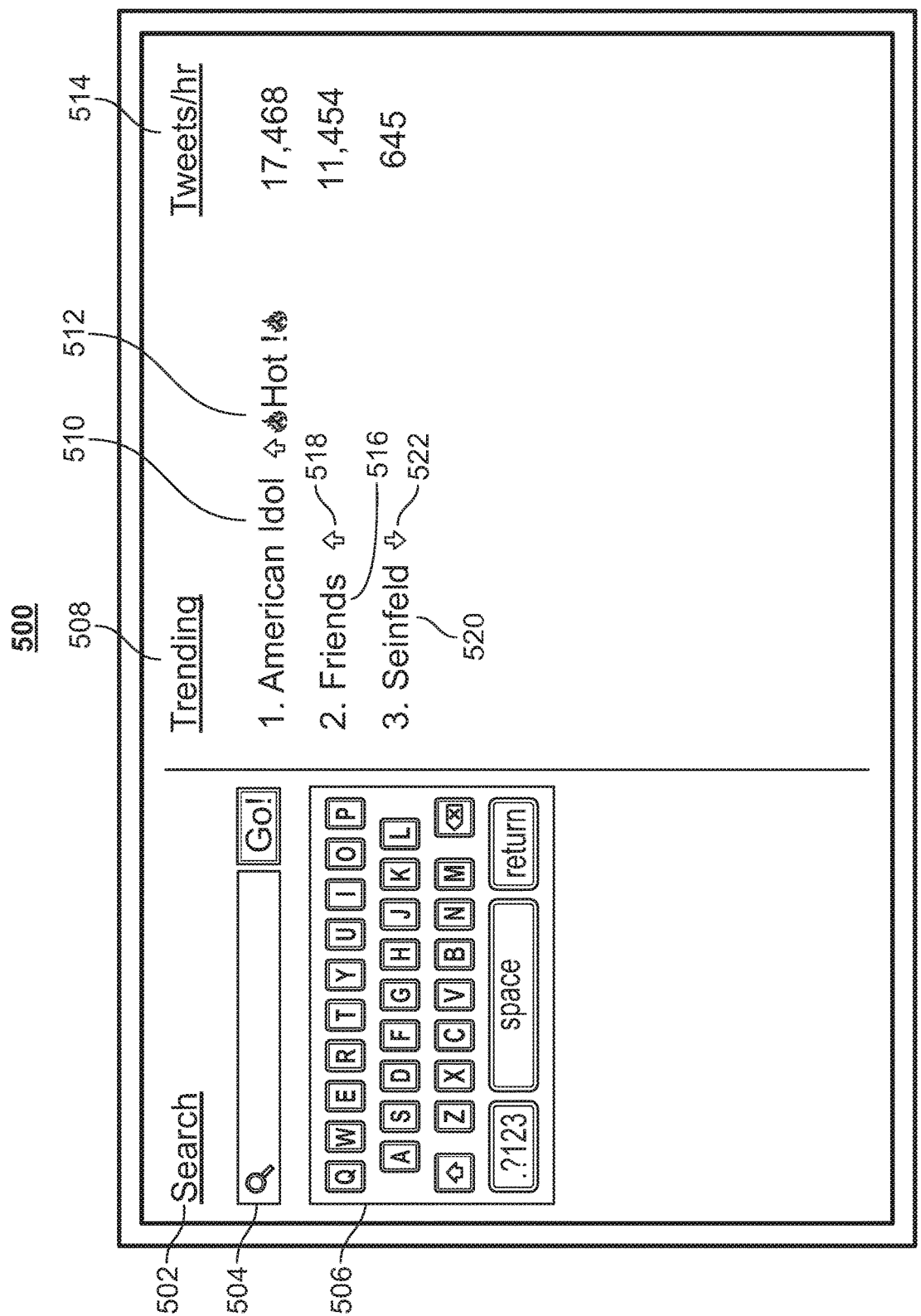
FIG. 5 shows an illustrative user search interface that provides a list of trending media assets in accordance with some embodiments of the disclosure.

FIG. 5 shows an illustrative user search interface 500 that provides a list of trending media assets in accordance with some embodiments of the disclosure. The user search interface 500 includes search region 502, search bar 504, keyboard 506, trending region 508, media asset listings 510, 516, and 520, trending icons 512, 518, and 522, and trending statistic 514. User search interface 500 may be implemented on any suitable user equipment, such as any one of user equipment 402, 404, or 406 depicted in FIG. 4. The user search interface 500 may be displayed on any suitable display, such as display 312 depicted in FIG. 3, and audio components of user search interface 500, if any, may be produced by any suitable audio device, such as speakers 314. The user search interface may also detect user input through detection module 316, which may include both visual sensors to detect physical gestures and audio sensors, such as a microphone, to detect audio/speech inputs.

In some embodiments, control circuitry (e.g., control circuitry 304, FIG. 3) may provide user search interface 500 as part of an interactive media guidance application. Search region 502 may provide a typical search bar 504 and keyboard 506 that allow a user to input one or more search terms into search bar 504, for example, using user input interface 310.

The control circuitry 304 may also provide trending region 508 that provides a list of trending media assets. The control circuitry 304 may provide the list of trending media assets 510, 516, and 520 at any suitable time, such as prior to the user entering any search terms, while the user is entering search terms, or after a user has entered all search terms and initiated a search. In embodiments where the control circuitry 304 provides the list of trending media assets 510, 516, and 520 prior to the user entering any search terms, the list of trending media assets 510, 516, and 520 may represent the currently trending media assets. In some embodiments, control circuitry 304 may rank the list of trending media assets 510, 516, and 520 according to how much the media assets are trending. In some embodiments, control circuitry 304 may rank the list of trending media assets 510, 516, and 520 according to another measure of popularity, such as critic rating, user rating/feedback, how many users are currently watching, how many users recorded, how many users set reminders to watch the media asset, or any combination thereof. In some embodiments, the control circuitry 304 may rank the list of trending media assets 510, 516, and 520 according to similarity to a user preference profile. For example, the control circuitry 304 may compare user preferences stored in a profile (e.g., at storage 308 or media guidance data source 418) to characteristics associated with the media assets in order to determine which media assets most closely match the user's preferences.

In some embodiments, the control circuitry 304 may provide list of trending media assets 510, 516, and 520 while the user is entering search terms into search bar 504, such that the list of trending media assets 510, 516, and 520 is dynamically populated based on partially-entered search queries. In these embodiments, control circuitry 304 may populate the list of trending media assets 510, 516, and 520 with media assets 510, 516, and 520 that are related to the user's entered search terms. For example, the list of media assets 510, 516, and 520 may correspond to media assets that at least partially match the user's search criteria. In some embodiments, the control circuitry 304 may dynamically change the list of trending media assets 510, 516, and 520 as the user enters or deletes search terms. In some embodiments, the control circuitry 304 may update the list of trending media assets 510, 516, and 520 in real-time as updated trending statistics, such as updated information on trending statistic 514, are received (e.g., from storage 308 or from media guidance data source 418 through communications network 414). With regard to trending region 508, while the term "list" is used herein to describe media assets 510, 516, and 520, it will be understood that the media assets 510, 516, and 520 are provided in a list as an illustrative example only, and that the media assets 510, 516, and 520 may be presented in any other suitable manner.

In some embodiments, the control circuitry 304 may identify a plurality of communications associated with a plurality of users (e.g., by way of user input interface 310), the plurality of communications being related to a topic. The plurality of users may be connected through a network, such as communication network 414 depicted in FIG. 4. In some embodiments, the communication network 414 may comprise a local network, such as a local area network (LAN), while in other embodiments, the communications network 414 may comprise the Internet. In some embodiments, the control circuitry 304 may directly receive the plurality of communications from the plurality of users (e.g., through user input interface 310). For instance, a media provider may receive user comments or feedback regarding certain media assets (e.g., through communications network 414). In some embodiments, the control circuitry 304 may receive indications of the plurality of communications from a third-party data source, such as media content source 416 or media guidance data source 418, both depicted in FIG. 4. For instance, the control circuitry 304 may query a social network server for information regarding user communications related to a particular topic. The control circuitry 304 may also query the third-party data source for indications of creation times and/or a rate of creation for the plurality of communications related to the topic. For example, as depicted in FIG. 5, the control circuitry 304 may receive information on the trending statistic 514, which is the number of Tweets per hour. In some embodiments, the control circuitry 304 may only receive trending statistic 514 for media assets that exceed a certain threshold statistic. In the illustrative example depicted in FIG. 5, the threshold number of Tweets per hour in order for a media asset to be considered "trending" may be set at 500 Tweets per hour.

As depicted in FIG. 5, control circuitry 304 may sort the list of trending media assets 510, 516, and 520 according to the trending statistic 514. In this example, the media assets 510, 516, and 520 are arranged in order of descending number of Tweets per hour. The control circuitry 304 may associate each of the media assets 510, 516, and 520 with respective icons 512, 518, and 522. As depicted by icons 518 and 522, the icons may indicate either an increase or a decrease in trending status (i.e., trending statistic 514) through an up arrow or a down arrow. In the example depicted in FIG. 5, the control circuitry 304 may associate the media asset "Friends" with an increase in Tweets per hour (represented by the up arrow 518), indicating that it's increasing in popularity, and may associate the media asset "Seinfeld" with a decrease in Tweets per hour (represented by the down arrow 522), indicating that "Seinfeld" is trending, but decreasing in popularity. In FIG. 5, the control circuitry 304 may associate the media asset "American Idol" with a trending statistic 514 that has exceeded a second threshold, indicating that "American Idol" is currently extremely popular, as evidenced by the "HOT!" icon 512 and the up arrow.

In some embodiments, the control circuitry 304 may identify, for each of the trending media assets 510, 516, and 520, a first symbol and a second symbol associated with the topic. As discussed above, the control circuitry 304 may access a database, such as media content source 416 or media guidance data source 418, both depicted in FIG. 4, that identifies the first symbol as being related to the second symbol. In some embodiments, the database may store a knowledge graph that identifies contextual relationships between symbols, including the first symbol and the second symbol. In some embodiments, the control circuitry 304 may determine that the first and the second symbols are related to the topic by referring to historical user search data, either directly (e.g., stored locally at storage 308) or indirectly (e.g., query a third-party data source such as media guidance data source 418 for the historical user search data). From the historical user search data, the control circuitry 304 may identify a plurality of prior search queries associated with the topic that contain at least one of the first symbol or the second symbol. If the number of prior search queries associated with the topic that contain at least one of the first or second symbol exceeds a threshold, then the control circuitry 304 may determine that the topic is related to the first or the second symbol.

In some embodiments, the control circuitry 304 may increase the strength of association between the first symbol and the second symbol based on the trending statistic 514. For example, the control circuitry 304 may increase the strength of association for the first and second symbols associated with "American Idol" a relatively large amount based on its high number of Tweets per hour compared to the other media assets 516 and 520. Similarly, the control circuitry 304 may increase the strength of association for the first and second symbols associated with "Seinfeld" a relatively small amount based on its low number of Tweets per hour compared to the other media assets 510 and 520. The control circuitry 304 may also increase the strength of association based on the rate of creation of the plurality of communications associated with the respective topics. For instance, since "American Idol" is indicated as "Hot!", i.e., increasing rapidly in popularity, the control circuitry 304 may boost the strength of association for the first and second symbols associated with "American Idol" compared to the symbols associated with the other topics. The control circuitry 304 may store the strength of association between the first and second symbols in any suitable location, including locally at storage 308 depicted in FIG. 3 or remotely at media content source 416, media guidance data source 418, or any of user equipment 402, 404, and 406 depicted in FIG. 4.

In some embodiments, the control circuitry 304 may determine whether the topic is no longer trending or is decreasing in popularity. For instance, the control circuitry 304 may detect that the number of communications relating to the particular topic being created is decreasing over time. In some embodiments, the control circuitry 304 may determine whether the plurality of communications related to the topic falls below a threshold number of communications or whether a rate at which the plurality of communications are created falls below a threshold rate. In these cases, the topic may no longer be considered as decreasing in popularity or no longer trending, and the control circuitry 304 may decrease the strength of association between the first symbol and the second symbol associated with that topic. As an illustrative example, the control circuitry 304 may monitor trending statistic 514 and determine whether the trending statistic 514 drops below a threshold value. If the trending statistic 514 does drop below the threshold value, then the control circuitry 304 may remove the media asset from the trending region 508 and decrease the strength of association of symbols related to that topic. In some embodiments, the strength of association is reverted back to an original value.

In some embodiments, the control circuitry 304 may detect when a topic is decreasing in popularity. Such topics may still be considered trending, such as the "Seinfeld" media asset 520 depicted in FIG. 5, but may be decreasing in popularity. The control circuitry 304 may make this determination by monitoring the rate of decrease of trending statistic 514. The control circuitry 304 may decrease the strength of association of the symbols relating to the topic accordingly. In some embodiments, the strength of association may be decreased based on the rate of decrease of trending statistic 514.

Figure 6:
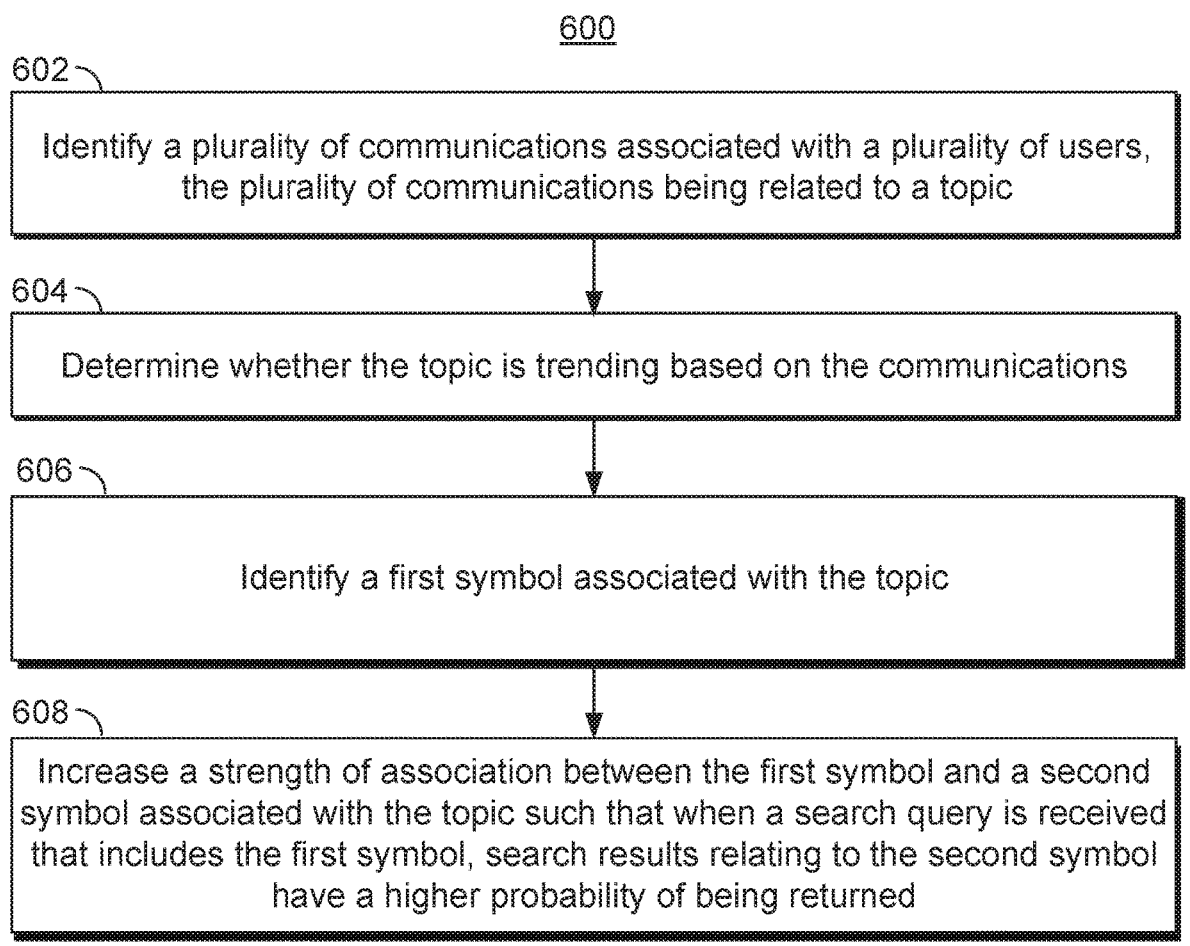
FIG. 6 is a flowchart of illustrative steps for updating links between keywords associated with a trending topic in accordance with some embodiments of the disclosure.

FIG. 6 is a flowchart 600 of illustrative steps for updating links between keywords associated with a trending topic in accordance with some embodiments of the disclosure. Flowchart 600 includes identifying a plurality of communications associated with a plurality of users, the plurality of communications being related to a topic at 602, determining whether a topic is trending based on the communications at 604, identifying a first symbol associated with the topic at 606, and in response to determining that the topic is trending, increasing a strength of association between the first symbol and a second symbol associated with the topic such that when a search query is received that includes the first symbol, search results relating to the second symbol have a higher probability of being returned at 608. It should be noted that process 600 or any thereof could be performed on, or provided by, any of the devices or combination of devices shown in FIGS. 3 and 4. For example, process 600 may be executed by control circuitry 304 (FIG. 3) as instructed by control circuitry implemented on user equipment 402, 404, and/or 406 (FIG. 4). In addition, one or more steps of process 600 may be incorporated into or combined with one or more steps of any other process or embodiments.

At 602, the control circuitry 304 may identify a plurality of communications associated with a plurality of users, the plurality of communications being related to a topic. For example, the control circuitry 304 may receive an indication of the plurality of communications from a remote data source, such as media guidance data source 418, through communications network 414. The plurality of communications may comprise one of: communications on an online social network, email messages, text messages, Internet communications, websites, mobile application communications, and/or communications received from a third-party data source (such as media guidance data source 418 depicted in FIG. 4). The control circuitry 304 may also receive the plurality of communications locally, such as from storage 308. As discussed above, the control circuitry 304 may identify the plurality of communications in any number of ways including, but not limited to, receiving the plurality of communications directly from a plurality of users (e.g., through user input interface 310) and/or querying a third-party database (e.g., media guidance data source 418) for the plurality of communications or indications of the plurality of communications.

At 604, the control circuitry 304 determines whether a topic is trending based on the communications. The control circuitry 304 may determine that a topic is trending if the plurality of communications exceeds a threshold number of communications. The threshold may be set in advance, for example by a media provider or an end user, and may be stored at storage 308 or media guidance data source 418. For example, an end user may set the threshold by inputting the threshold through the user input interface 310, and in response, the control circuitry 304 may store the threshold at either storage 308, media guidance data source 418, or both. The control circuitry 304 may further retrieve the threshold from either storage 308 or media guidance data source 418. The control circuitry 304 may also determine whether a topic is trending if a rate at which the plurality of communications are created exceeds a threshold rate. In some embodiments, the control circuitry 304 may receive from a third-party data source (e.g., media guidance data source 418) an indication that the topic is trending. For example, Facebook may send a list of trending media assets to the control circuitry 304.

At 606, the control circuitry 304 may identify a first symbol associated with the topic. The control circuitry 304 may identify the first symbol using any technique discussed above or below. For instance, the control circuitry 304 may access a database (such as media guidance data source 418) that maintains a knowledge base comprising contextual links between symbols to identify the first and second symbols related to the topic. The control circuitry 304 may also analyze historical user search query data (e.g., stored at media guidance data source 418 and received through communications network 414) to calculate statistics on the probability that the first symbol appears in search queries associated with the topic. If the probability exceeds a certain threshold, then the control circuitry 304 may determine that the first symbol is associated with the topic.

At 608, the control circuitry 304 may increase a strength of association between the first symbol and a second symbol associated with the topic such that when a search query is received that includes the first symbol, search results relating to the second symbol have a higher probability of being returned. As discussed above, the strength of association may be increased based on, for example, the number of communications, by how much the plurality of communications exceeds a threshold number of communications, the rate of creation of the plurality of communications, or by how much the rate of creation of the plurality of communications exceeds a threshold rate.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 6.

Figure 7:
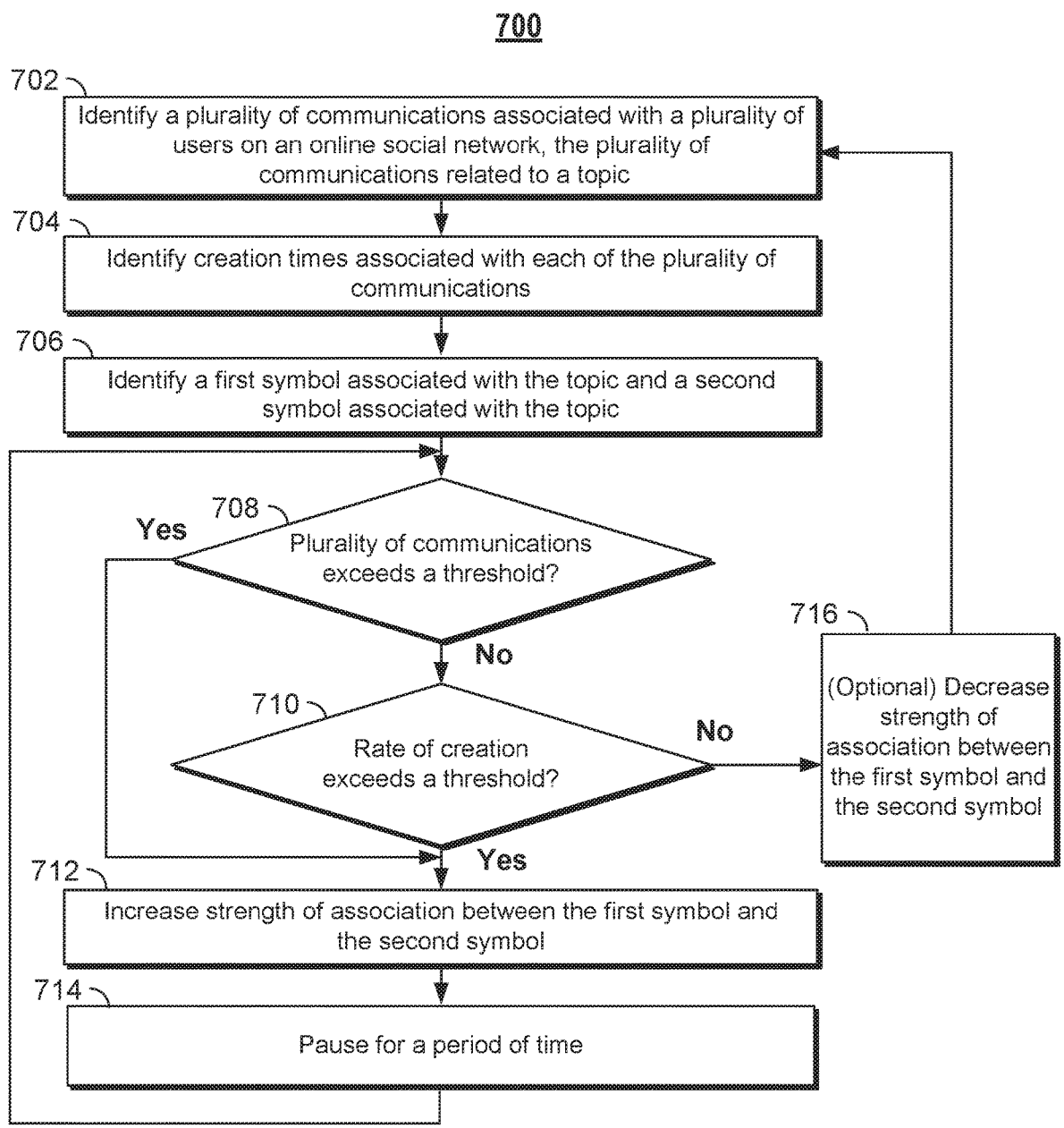
FIG. 7 is another flowchart of illustrative steps for updating links between keywords associated with a trending topic in accordance with some embodiments of the disclosure.

FIG. 7 depicts a flowchart 700 of illustrative steps for updating links between keywords associated with a trending topic in accordance with some embodiments of the disclosure. Flowchart 700 includes identifying a plurality of communications associated with a plurality of users on an online social network, the plurality of communications related to a topic at 702, identifying creation times associated with each of the plurality of communications at 704, identifying a first symbol associated with the topic and a second symbol associated with the topic at 706, determining whether the plurality of communications exceeds a threshold at 708, determining whether a rate of creation of the plurality of communications exceeds a threshold rate at 710, increasing a strength of association between the first symbol and the second symbol at 712, pausing for a period of time at 714, and optionally decreasing the strength of association between the first symbol and the second symbol at 716. It should be noted that process 700 or any step thereof could be performed on, or provided by, any of the devices or combination of devices shown in FIGS. 3 and 4. For example, process 700 may be executed by control circuitry 304 (FIG. 3) as instructed by control circuitry 304 implemented on user equipment 402, 404, and/or 406 (FIG. 4). In addition, one or more steps of process 700 may be incorporated into or combined with one or more steps of any other process or embodiments.

At 702, the control circuitry 304 may identify a plurality of communications associated with a plurality of users on an online social network. The online social network may be maintained on a remote server, such as media content source 416 or media guidance data source 418, both depicted in FIG. 4. 702 may be substantially similar to 602 depicted in FIG. 6, except that the communications are associated with a plurality of users on an online social network. Communications associated with users on an online social network may be especially useful for identifying trending topics because the number of communications on the social network about the topic and/or the rate at which such communications are created may be a direct measure for determining how popular a topic is with the general public. As discussed, above, the control circuitry 304 may identify the plurality of communications in any suitable manner, including receiving the communications directly (e.g., through user input interface 310), retrieving the communications from local storage (e.g., from storage 308), or querying a third-party data source (e.g., media guidance data source 418) for the plurality of communications or indications of the plurality of communications.

At 704, the control circuitry 304 may identify creation times associated with each of the plurality of communications. For example, each of the plurality of communications may correspond to a post on the online social network at a particular point in time. The control circuitry 304 may query a third-party data source (e.g., media guidance data source 418) for indications of creation times and/or a rate of creation for the plurality of communications related to the topic. For example, as depicted in FIG. 5, the control circuitry 304 may receive information on the trending statistic 514, which is the number of Tweets per hour. In some embodiments, the control circuitry 304 may only receive trending statistic 514 for media assets that exceed a certain threshold statistic. In the illustrative example depicted in FIG. 5, the threshold number of Tweets per hour in order for a media asset to be considered "trending" may be set at 500 Tweets per hour.

At 706, the control circuitry 304 may identify a first symbol associated with the topic and a second symbol associated with the topic, in much the same manner as discussed above with respect to 606 depicted in FIG. 6. As discussed above, the control circuitry 304 may access a database, such as media content source 416 or media guidance data source 418, both depicted in FIG. 4, that identifies the first symbol as being related to the topic. In some embodiments, the database may store a knowledge graph that identifies contextual relationships between symbols, including relationships between the first symbol, the second symbol, and the topic. In some embodiments, the control circuitry 304 may determine that the first and the second symbols are related to the topic by referring to historical user search data, either directly (e.g., stored locally at storage 308) or indirectly (e.g., query a third-party data source such as media guidance data source 418 for the historical user search data). From the historical user search data, the control circuitry 304 may identify a plurality of prior search queries associated with the topic that contain at least one of the first symbol or the second symbol. The prior search queries may be stored either locally (e.g., on storage 308) or remotely (e.g., at media guidance data source 418). If the number of prior search queries associated with the topic that contain at least one of the first or second symbol exceeds a threshold, then the control circuitry 304 may determine that the topic is related to the first or the second symbol.

At 708, the control circuitry 304 may determine whether the plurality of communications exceeds a threshold number of communications. The threshold number of communications may be set in advance, for example by a media provider, service provider, or end user, and may be stored, for example, at storage 308 or media guidance data source 418. In some embodiments, the threshold number of communications for determining whether a topic is trending may be changed by the end user using any suitable user interface, such as user search interface 500 depicted in FIG. 5. If the plurality of communications exceeds the threshold number of communications, then the topic may be deemed as "trending," and the control circuitry 304 may proceed to 712. If the plurality of communications does not exceed the threshold number of communications, then the control circuitry 304 may proceed to 710 as a secondary test for whether the topic is trending.

At 710, the control circuitry 304 may determine whether a rate of creation of the plurality of communications exceeds a threshold rate. For instance, as depicted in the illustrative example in FIG. 5, "American Idol" may be indicated as "Hot!", i.e., increasing rapidly in popularity, because the rate of creation of the plurality of communications relating to "American Idol" has exceeded a threshold rate. If the rate of creation of the plurality of communications exceeds the threshold rate, then the control circuitry 304 may proceed to 712. If the rate of creation of the plurality of communications does not exceed the threshold rate, then the control circuitry 304 may proceed to 716 and optionally decrease the strength of association between the first symbol and the second symbol. After 716, the control circuitry 304 may return to 702 to restart the process 700.

At 712, the control circuitry 304 may increase a strength of association between the first symbol and the second symbol. 712 may be substantially similar to 608 discussed above in relation with FIG. 6. For example, the control circuitry 304 may increase the strength of association between the first symbol and the second symbol based on a trending statistic, such as trending statistic 514 depicted in FIG. 5. As discussed above in relation to the illustrative example depicted in FIG. 5, the control circuitry 304 may increase the strength of association for the first and second symbols associated with "American Idol" a relatively large amount based on its high number of Tweets per hour compared to the other media assets 516 and 520. Similarly, the control circuitry 304 may increase the strength of association for the first and second symbols associated with "Seinfeld" a relatively small amount based on its low number of Tweets per hour compared to the other media assets 510 and 520. The control circuitry 304 may also increase the strength of association based on the rate of creation of the plurality of communications associated with the respective topics. For instance, since "American Idol" is indicated as "Hot!", i.e., increasing rapidly in popularity, the control circuitry 304 may boost the strength of association for the first and second symbols associated with "American Idol" compared to the symbols associated with the other topics. The control circuitry 304 may store the strength of association between the first and second symbols in any suitable location, including locally at storage 308 depicted in FIG. 3 or remotely at media content source 416, media guidance data source 418, or any of user equipment 402, 404, and 406 depicted in FIG. 4.

After increasing the strength of association at 712, the control circuitry 304 may pause for a period of time at 714 before returning to 708. During the period of time, more communications relating to the topic may have been created, and the control circuitry 304 may make another determination of whether the topic is trending via steps 708 and 710. If the topic is trending upwards, then the control circuitry 304 will continue through steps 708 and 710 as discussed above, and increase the strength of association once again at 712. If the topic is trending downwards, then the control circuitry 304 will proceed to 716 and optionally decrease the strength of association between the first symbol and the second symbol. In this manner, the control circuitry 304 may gradually decrease the strength of association over time back to an original strength of association.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 7.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, updating links between keywords associated with a trending topic may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, the strength of association between keywords as described herein may be stored in, and retrieved from, storage 308 of FIG. 3, or media guidance data source 418 of FIG. 4. Furthermore, processing circuitry, or a computer program, may update settings associated with a user, such as user profile preferences, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for updating associations between words in a search environment, the method comprising:
    identifying a plurality of communications over a network connection during a first period of time, wherein the plurality of communications are associated with a topic;
    determining whether a rate at which communications within the plurality of communications are created during the first period exceeds a predetermined rate;
    in response to determining that the rate at which the communications within the plurality of communications are created exceeds the predetermined rate, increasing a stored strength of association between a first keyword and a second keyword, wherein the first keyword and the second keyword are associated with the topic;
    receiving, subsequent to the first period of time, a first search query that comprises the first keyword;
    in response to receiving the first search query that comprises the first keyword:
        determining whether the stored strength of association between the first keyword and the second keyword exceeds a predetermined minimum strength; and
        in response to determining that the stored strength of association exceeds the predetermined minimum strength, identifying search results matching the first keyword and the second keyword;
    determining that a predetermined amount of time has elapsed since increasing the stored strength of association between the first keyword and the second keyword;
    in response to determining that the predetermined amount of time has elapsed since increasing the strength of association, decreasing the stored strength of association between the first keyword and the second keyword;
    receiving, after the predetermined time has elapsed, a second search query that comprises the first keyword; and
    in response to receiving the second search query that comprises the first keyword:
        determining whether the stored strength of association exceeds the predetermined minimum strength; and
        in response to determining that the stored strength of association does not exceed the predetermined minimum strength, searching for results matching the first keyword without searching for results matching the second keyword.

2. The method of claim 1, further comprising increasing the stored strength of association, in response to determining that the rate at which the communications within the plurality of communications are created exceeds the predetermined rate, from a first strength that is lower than the predetermined minimum strength to a second strength that is greater than the predetermined minimum strength.

3. The method of claim 1, wherein the plurality of communications comprises one of: communications on an online social network, email messages, text messages, Internet communications, websites, mobile application communications, and/or communications received from a third-party data source.

4. The method of claim 1, wherein determining whether the rate at which the communications within the plurality of communications are created exceeds the predetermined rate comprises, receiving, from a third party data source, third party data indicating that the rate at which the communications within the plurality of communications are created exceeds the predetermined rate.

5. The method of claim 1, wherein the communications in the plurality of communications are created by a plurality of users.

6. The method of claim 1, wherein the strength of association between the first keyword and the second keyword is stored in a knowledge graph.

7. The method of claim 1, further comprising, in response to determining that the stored strength of association exceeds the predetermined minimum strength, generating for display the search results matching the first keyword and the second keyword.

8. A system for updating associations between words in a search environment, the system comprising control circuitry configured to:
   identify a plurality of communications over a network connection during a first period of time, wherein the plurality of communications are associated with a topic;
   determine whether a rate at which the communications within the plurality of communications are created during the first period exceeds a predetermined rate;
   in response to determining that the rate at which the communications within the plurality of communications are created exceeds the predetermined rate, increase a stored strength of association between a first keyword and a second keyword, wherein the first keyword and the second keyword are associated with the topic;
   receive, subsequent to the first period of time, a first search query that comprises the first keyword; and
   in response to receiving the first search query that comprises the first keyword:
      determine whether the stored strength of association between the first keyword and the second keyword exceeds a predetermined minimum strength; and
      in response to determining that the stored strength of association exceeds the predetermined minimum strength, identify search results matching the first keyword and the second keyword;
   determine that a predetermined amount of time has elapsed since increasing the stored strength of association between the first keyword and the second keyword;
   in response to determining that the predetermined amount of time has elapsed since increasing the strength of association, decrease the stored strength of association between the first keyword and the second keyword;
   receive, after the predetermined time has elapsed, a second search query that comprises the first keyword; and
   in response to receiving the second search query that comprises the first keyword:
      determine whether the stored strength of association exceeds the predetermined minimum strength; and
      in response to determining that the stored strength of association does not exceed the predetermined minimum strength, search for results matching the first keyword without searching for results matching the second keyword.

9. The system of claim 8, wherein the control circuitry is further configured to increase the stored strength of association, in response to determining that the rate at which the communications within the plurality of communications are created exceeds the predetermined rate, from a first strength that is lower than the predetermined minimum strength to a second strength that is greater than the predetermined minimum strength.

10. The system of claim 8, wherein the plurality of communications comprises one of: communications on an online social network, email messages, text messages, Internet communications, websites, mobile application communications, and/or communications received from a third-party data source.

11. The system of claim 8, wherein the control circuitry is further configured, when determining whether the rate at which the communications within the plurality of communications are created exceeds the predetermined rate, to receive, from a third party data source, third party data indicating that the rate at which the communications within the plurality of communications are created exceeds the predetermined rate.

12. The system of claim 8, wherein the communications within the plurality of communications are created by a plurality of users.

13. The system of claim 8, wherein the strength of association between the first keyword and the second keyword is stored in a knowledge graph.

14. The system of claim 8, wherein the control circuitry is further configured to generate for display the search results matching the first keyword and the second keyword in response to determining that the stored strength of association exceeds the predetermined minimum strength.

* * * * *